(12) United States Patent
Cao et al.

(10) Patent No.: US 8,934,369 B2
(45) Date of Patent: Jan. 13, 2015

(54) DIRECTION AWARE NEIGHBOR LIST INFRASTRUCTURE ASSISTED ROAMING

(71) Applicant: Cisco Technology, Inc., San Jose, CA (US)

(72) Inventors: Min Cao, Milpitas, CA (US); Tak Ming Pang, Palo Alto, CA (US); Hari Rangarajan, San Jose, CA (US); Allan Thomson, Pleasanton, CA (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 175 days.

(21) Appl. No.: 13/645,576

(22) Filed: Oct. 5, 2012

(65) Prior Publication Data

US 2014/0098682 A1 Apr. 10, 2014

(51) Int. Cl.
  *H04W 36/08* (2009.01)
(52) U.S. Cl.
  USPC .......................................... 370/252; 370/331
(58) Field of Classification Search
  USPC ......... 370/252, 328–329, 331–333, 335–336, 370/338, 342–343, 345, 432, 437, 441–442, 370/465, 479–480
  See application file for complete search history.

(56) References Cited

U.S. PATENT DOCUMENTS

| 6,865,185 | B1 | 3/2005 | Patel et al. |
|---|---|---|---|
| 7,031,266 | B1 | 4/2006 | Patel et al. |
| 7,397,779 | B2 | 7/2008 | Chandra et al. |
| 7,529,218 | B2 | 5/2009 | Lyons et al. |
| 7,602,746 | B2 | 10/2009 | Calhoun et al. |
| 7,657,262 | B2 | 2/2010 | Grayson |
| 7,684,355 | B2 | 3/2010 | Meier et al. |
| 7,826,463 | B2 | 11/2010 | Patel et al. |
| 7,936,681 | B2 | 5/2011 | Gong et al. |
| 7,944,886 | B2 | 5/2011 | Stephenson et al. |
| 8,644,275 | B2 * | 2/2014 | Baier ............................ 370/338 |
| 2005/0060319 | A1 | 3/2005 | Douglas et al. |
| 2006/0270411 | A1 | 11/2006 | Grayson |
| 2007/0054617 | A1 * | 3/2007 | Nikolajevic et al. ......... 455/41.2 |
| 2007/0076671 | A1 * | 4/2007 | Winget et al. ................. 370/338 |
| 2007/0258393 | A1 * | 11/2007 | Cam-Winget et al. ........ 370/310 |
| 2008/0146230 | A1 | 6/2008 | Pandian et al. |
| 2008/0293405 | A1 | 11/2008 | Meyer |
| 2009/0286534 | A1 | 11/2009 | Garg et al. |
| 2010/0118830 | A1 | 5/2010 | Stephenson et al. |
| 2011/0002295 | A1 | 1/2011 | Ghosal et al. |
| 2011/0176523 | A1 * | 7/2011 | Huang et al. .................. 370/338 |

(Continued)

OTHER PUBLICATIONS

Allawi, et al., "Advanced Handoff Mechanism for Delay Sensitive Applications in IEEE 802.11 Wireless LAN," Feb. 17-20, 2008.

(Continued)

*Primary Examiner* — Kevin Mew
(74) *Attorney, Agent, or Firm* — Edell, Shapiro & Finnan, LLC

(57) ABSTRACT

The direction of movement of a wireless local area network client device, determined based on data generated by one or more sensors onboard the client device, is provided by the client device to its serving access point. Using the direction of movement information, a list is generated of neighbor access points that are likely to be in the path of travel of the client device. The list may be generated by the serving access point or another infrastructure device, e.g., a wireless network controller. The serving access point sends the list of neighbor access points to the client device to enable the client device to select an access point to roam to at the appropriate time.

33 Claims, 11 Drawing Sheets

(56) References Cited

U.S. PATENT DOCUMENTS

2011/0274000 A1* 11/2011 King et al. .................... 370/252
2012/0082144 A1* 4/2012 Lee ............................... 370/338
2013/0070739 A1* 3/2013 McCann et al. ............. 370/338

OTHER PUBLICATIONS

Bahl, et al., Microsoft Research, "Radar: An In-Building RF-based User Location and Tracking System," IEEE INFOCOM 2000, pp. 775-784.
Brik, et al., "Eliminating handoff latencies in 802.11 WLANs using Multiple Radios: Applications, Experience, and Evaluation," ACM SIGCOMM IMC, Oct. 2005.
Caceres, et al., "Fast and Scalable Handoffs for Wireless Interworks," Proc. of ACM MobiCom '96, Nov. 1996.
Gonzalez, et al., "Understanding individual human mobility patterns," Nature, vol. 453, Jun. 5, 2008, pp. 779-782.
Ghosh, et al., "On Profiling Mobility and Predicting Locations of Campus-wide Wireless Network Users," UB-CSE Technical Report, May 2006.
Kim, et al., "Extracting a mobility model from real user traces," IEEE InfoCom, 2006.
Kim, et al., "Selective Channel Scanning for Fast Handoff in Wireless LAN using Neighbor Graph," The 2004 International Technical Conference on Circuits/Systems, Computers and Communications (ITC-CSCC2004), Hotel Taikanso, Sendai/Matsushima, Jul. 6-8, 2004, pp. 7F2P-29-1 to 7F2P-29-4.
Kleimola, et al., "Latency Issues in Distributed Musical Performance," Helsinki University of Technology, Telecommunications Software and Multimedia Laboratory, T-111.5080 Seminar on Content Creation, Fall 2006: Interactive Digital Theatre, Dec. 20, 2006, pp. 1-14.
Nicholson, et al., "BreadCrumbs: Forecasting Mobile Connectivity," Proceedings of the 14th ACM international Conference on Mobile Computing and Networking, Sep. 14-19, 2008.
Park, et al., "Effects of Network Characteristics on Human Performance in a Collaborative Virtual Environment," Proceedings of the IEEE Virtual Reality, Mar. 13-17, 1999.
Ramani, et al., "SyncScan: Practical Fast Handoff for 802.11 Infrastructure Networks," Proceedings of IEEE Infocom, 2005.
Shin, et al., "Improving the Latency of 802.11 Hand-offs using Neighbor Graphs," MobiSys'04, Jun. 6-9, 2004.
Song, et al., "Predictability of WLAN Mobility and its Effects on Bandwidth Provisioning," Proceedings of INFOCOM, Apr. 2006.
Song, et al., "Evaluating Location Predictors with Extensive Wi-Fi Mobility Data," IEEE INFOCOM, 2004.
Veriwave, "Large-scale Wireless Mobility Testing: Getting a handle on WLAN roaming issues," May 8, 2006.
IEEE, "IEEE Standard for Information technology, Telecommunications and information exchange between systems, Local and metropolitan area networks, Specific requirements, Part 11: Wireless LAN Medium Access Control (MAC) and Physical Layer (PHY) Specifications, Amendment 2: Fast Basic Service Set (BSS) Transition," IEEE Std 802.11r, 2008.
Michaelis, et al., "Comparison of User Mobility Pattern Prediction Algorithms to increase Handover Trigger Accuracy," IEEE Vehicular Technology Conference, May 2006.
Kwon, et al., "Handover prediction strategy for 3G-WLAN overlay networks," Network Operations and Management Symposium, 2008, NOMS 2008.
Pack, et al., "Fast Handoff Scheme based on Mobility Prediction in Public Wireless LAN Systems," IEEE Proceedings Communications, vol. 151, No. 5, pp. 489-495, Oct. 2004.
Issac, et al., "Wireless Mobility Management with Prediction, Delay Reduction and Resource Management in 802.11 Networks," IAENG International Journal of Computer Science, 35:3, Advanced online publication, Aug. 21, 2008.
Ravindranath, et al., "Improving Wireless Network Performance Using Sensor Hints," Proceedings of the 8th USENIX Conference on Networked Systems Design and Implementation, Mar. 30-Apr. 1, 2011, pp. 1-14.

* cited by examiner

DIRECTION AWARE NEIGHBOR LIST INFRASTRUCTURE ASSISTED ROAMING

TECHNICAL FIELD

The present disclosure relates to wireless local area networks.

BACKGROUND

According to the IEEE 802.11 wireless local area network (WLAN) standard, a wireless client device can obtain a neighbor report from the access point to which it is associated. The neighbor report is a listing of the neighbor access points to which the client device can roam. The client device uses the neighbor report to select which access point it should roam to based on various criteria, including signal strength with respect to the access point it is currently associated to, access point traffic load, missing beacon, missing acknowledgement, high number of re-transmissions, low date rate from access point, etc.

When a client device moves around a region served by multiple access points, the ability to seamlessly roam from one access point to another access point is important to maintain a high quality of service to the client device.

DESCRIPTION OF EXAMPLE EMBODIMENTS

Overview

The direction of movement of a wireless local area network client device, determined based on data generated by one or more sensors onboard the client device, is provided by the client device to its serving access point. Using the direction of movement information, along with other information, a list is generated of neighbor access points that are likely to be in the path of travel of the client device. The list may be generated by the serving access point, a wireless network controller, a network management server or another access point in the wireless network.

From the perspective of the wireless client device, the wireless client device determines its direction of movement with one or more sensors internal or attached to the wireless client device. The wireless client device sends to its serving access point device a message including direction of movement information derived from the one or more sensors. The wireless client device receives from its serving access point device a message that includes a list of neighbor access points generated on the basis of the direction of movement information.

Example Embodiments

Presented herein are techniques to assist a wireless client device when roaming from one access point to another access point in a wireless local area network. Prior systems use measurements obtained from client probe messages received when the client device performs channel scanning to determine the client location, from which a list of neighbor access points may be computed. However, hand-held clients are very power conscious and can save power and improve performance by avoiding the need to send probe messages and perform off-channel active scanning.

Further, current wireless local area network infrastructure has limited intrinsic knowledge of where the client is going and even less knowledge about which direction the client is even facing. Therefore, the infrastructure has no way of being able to refine the list of transition access point candidates based on the direction of travel of the client device. Hence, today the WLAN infrastructure has no way to refine the list of access points based on client device direction of travel.

Accordingly, direction of movement information of a client device, determined based on data generated by one or more sensors onboard the client device, is provided by the client device to its serving access point. The direction of movement information is useful because it indicates or can be used to predict a future position of the client device. The direction of movement information, along with other information, is used to generate a list of neighbor access points that are likely to be in the path of travel of the client device.

Figure 1:
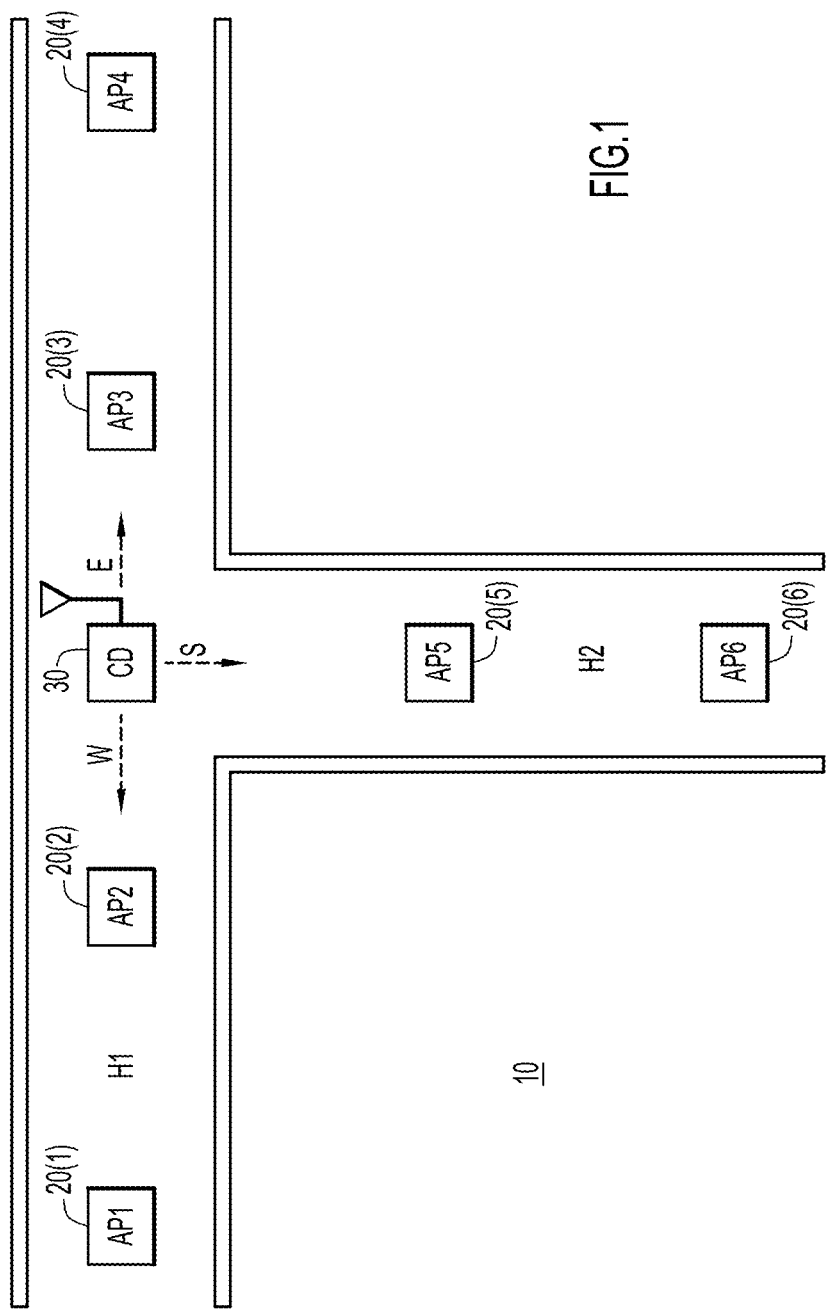
FIGS. 1-5 are example diagrams showing how direction of movement information determined by a client device can be used to assist the client device in selecting an access point to which to roam.

Referring first to FIG. 1, a diagram is shown of a wireless local area network (WLAN) deployment 10 comprising a plurality of wireless access points (APs) 20(1)-20(6), also denoted AP1-AP6, respectively. A wireless client device (CD) 30 operates in the WLAN deployment 10. As shown in the example of FIG. 1, the CD 30 may move in two directions along hallway/corridor H1 and in one direction in hallway/corridor H2. Specifically, the CD 30 may move west (W) or east (E) in hallway H1 and south in hallway H2. In this example, the CD 30 is associated to AP 20(2). As the CD 30 moves, its direction of movement will largely determine which of the other APs shown in FIG. 1 are in its path and would likely associate to as it continues along that path. If the CD 30 is moving eastward, then it most likely will associate to AP 20(3). If the CD is moving southward, then it most likely will associate to AP 20(5) or AP 20(6). According to the techniques described herein, the direction of movement of the CD 30 is used to provide a list of preferred APs to which the CD 30 may roam, where the list of preferred APs is generated based on the direction of movement of the CD 30.

A digital compass and motion sensors are standard equipment for current smart phones and wireless handheld devices. A CD equipped with a digital compass and/or motion sensors can accurately estimate the direction of movement of the CD.

Thus, according to one aspect of the techniques described herein, the CD 30, equipped with a compass and/or motion sensor(s), sends direction of movement information (derived from output of its compass and/or motion sensor(s)) to the AP to which it is associated in order to receive a list of neighbor APs that is specific to the CD 30, and which list of neighbor APs is based at least in part on the direction of movement information of the CD 30. In this way, the neighbor list that the CD 30 receives is "fine-tuned" to its direction of movement, as opposed to a generic list of all neighbor APs. As will described further hereinafter, the list of neighbor APs based at least in part on the direction of movement information of the CD may be generated by the serving AP of the CD. In systems that use a wireless network controller connected to each of the APs, then the serving AP may forward the direction of movement information to the wireless network controller, and the wireless network controller generates the list of neighbor APs for the CD, sends the list to the serving AP, and the serving AP sends the list of neighbor APs in an over-the-air message to the CD. As another alternative, an AP (other than the serving AP) may generate the list. For example, multiple APs may communicate with each other to distribute certain operations among them in a so-called "distributed controller" architecture. In still another example, a network management server, which communicates with each of a plurality of wireless network controllers, may generate the list and related information.

Figure 2:
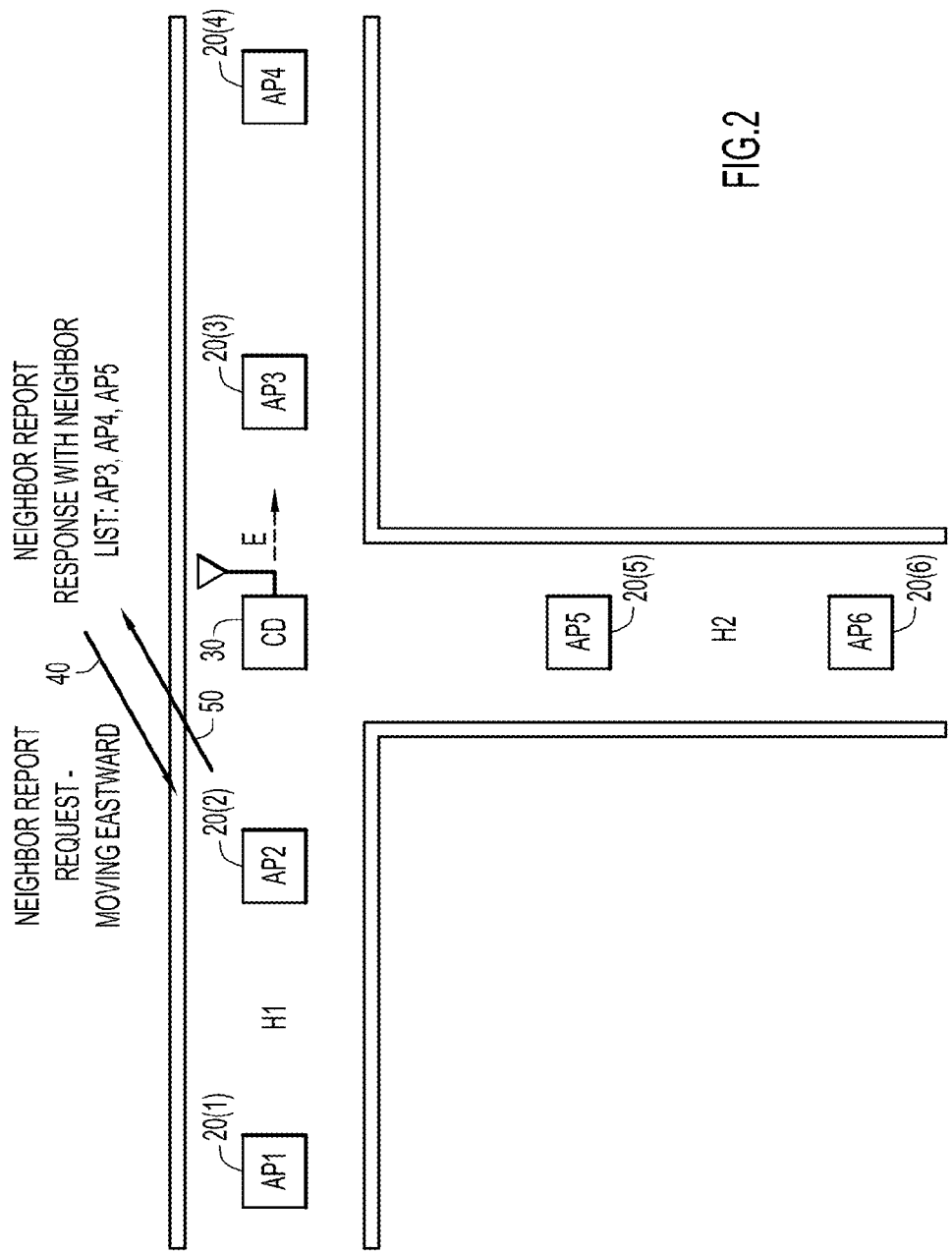

Examples of using the CD-originated direction of movement information for supplying an AP neighbor list to the CD are described now with reference to FIGS. 2-5. In each of these examples, the CD 30 is currently associated to AP 20(2). In FIG. 2, the CD 30 sends a neighbor report request message 40 with information indicating that it is moving eastward, which direction of movement information is derived from output from the compass and/or motion sensors in the CD 30. The AP 20(2) to which the CD 30 is currently associated receives the message 40, and the AP 20(2) or a wireless network controller (not shown in FIG. 2) evaluates the direction of movement information contained in the message (as well as the location of the CD 30 using any heretofore known or hereinafter developed location techniques) to generate an AP neighbor list for transmission to the CD 30 in a neighbor report response message 50. For example, the order of the APs listed in the message 50 is tuned to the movement direction of the CD 30, e.g., a list of APs in decreasing order of preference, such as: AP3, AP4, AP5. The number of APs contained in the AP neighbor list may be size-limited, e.g., up to four APs.

Figure 3:
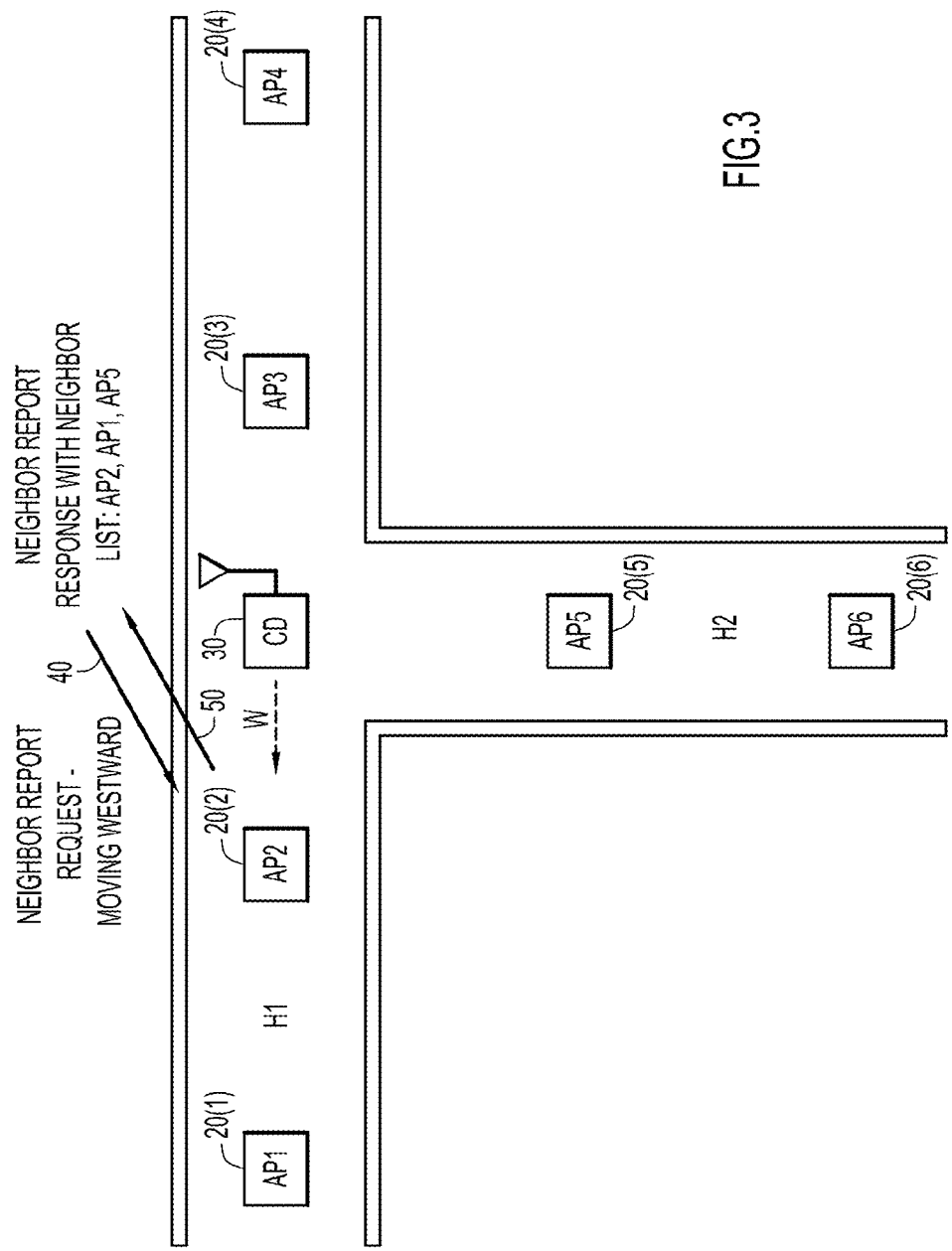

FIG. 3 shows an example in which the CD 30 is moving westward. In this case, it sends the neighbor report request message 40 indicating that it is moving westward. The direction of movement of CD 30 from the message 40 is evaluated to generate a direction-of-movement based AP neighbor list: AP2, AP1, AP5 (in decreasing order of preference), that is included in the neighbor report response message 50 sent back to the CD 30.

Figure 4:
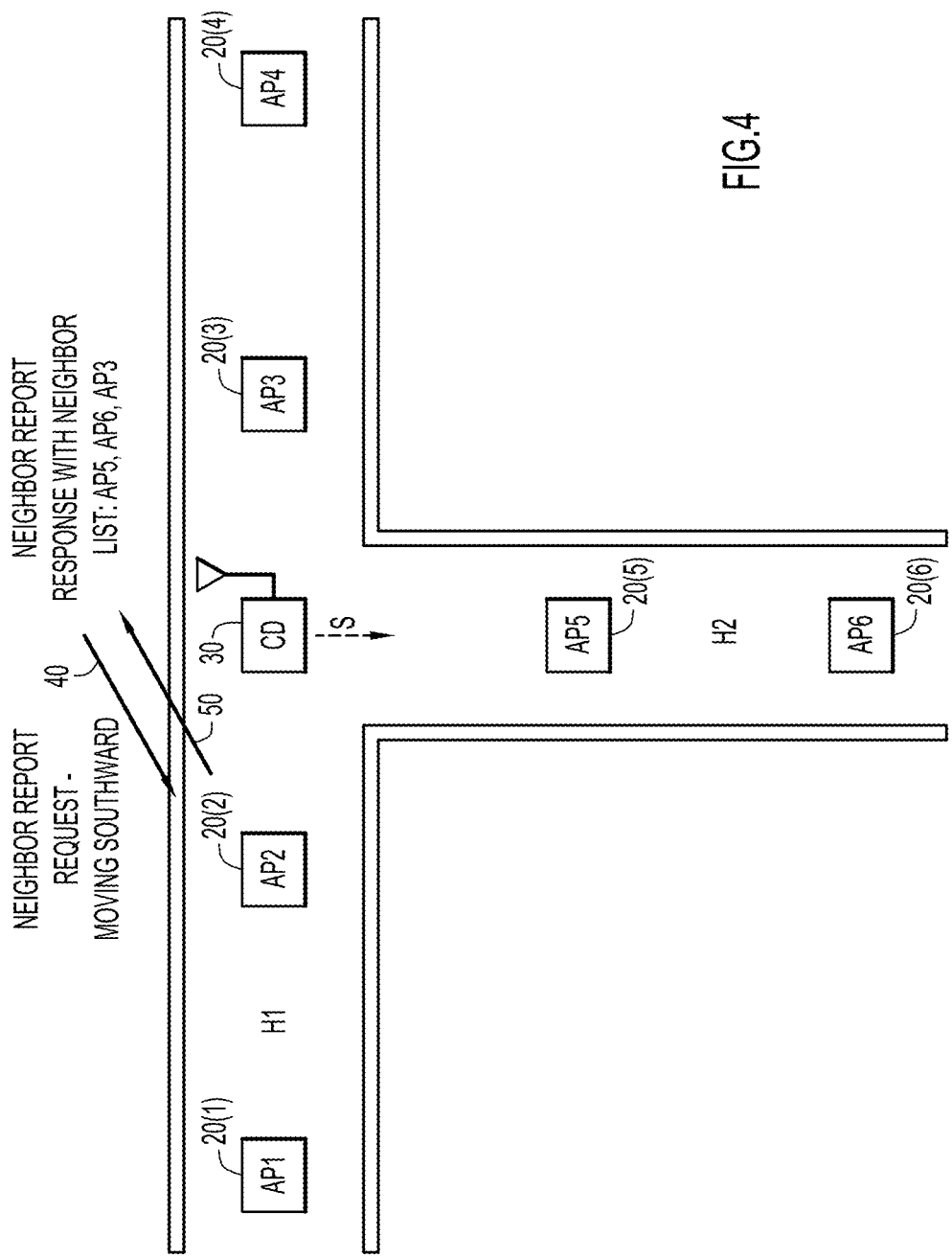

FIG. 4 shows an example in which the CD 30 is moving southward. The direction of movement information contained in the neighbor report request message 40 is evaluated to generate a direction-of-movement AP neighbor list: AP5, AP6, AP3 (in decreasing order of preference).

Thus, as depicted in FIGS. 2-4, the AP neighbor list is different for each scenario depending on the direction of movement of the CD 30. Moreover, the order of the APs listed in the AP neighbor list is different and dependent on the current location of the CD 30 and the direction of movement.

As described further hereinafter, additional criteria may be applied to the generation and preference order of APs in the AP neighbor list.

Figure 5:
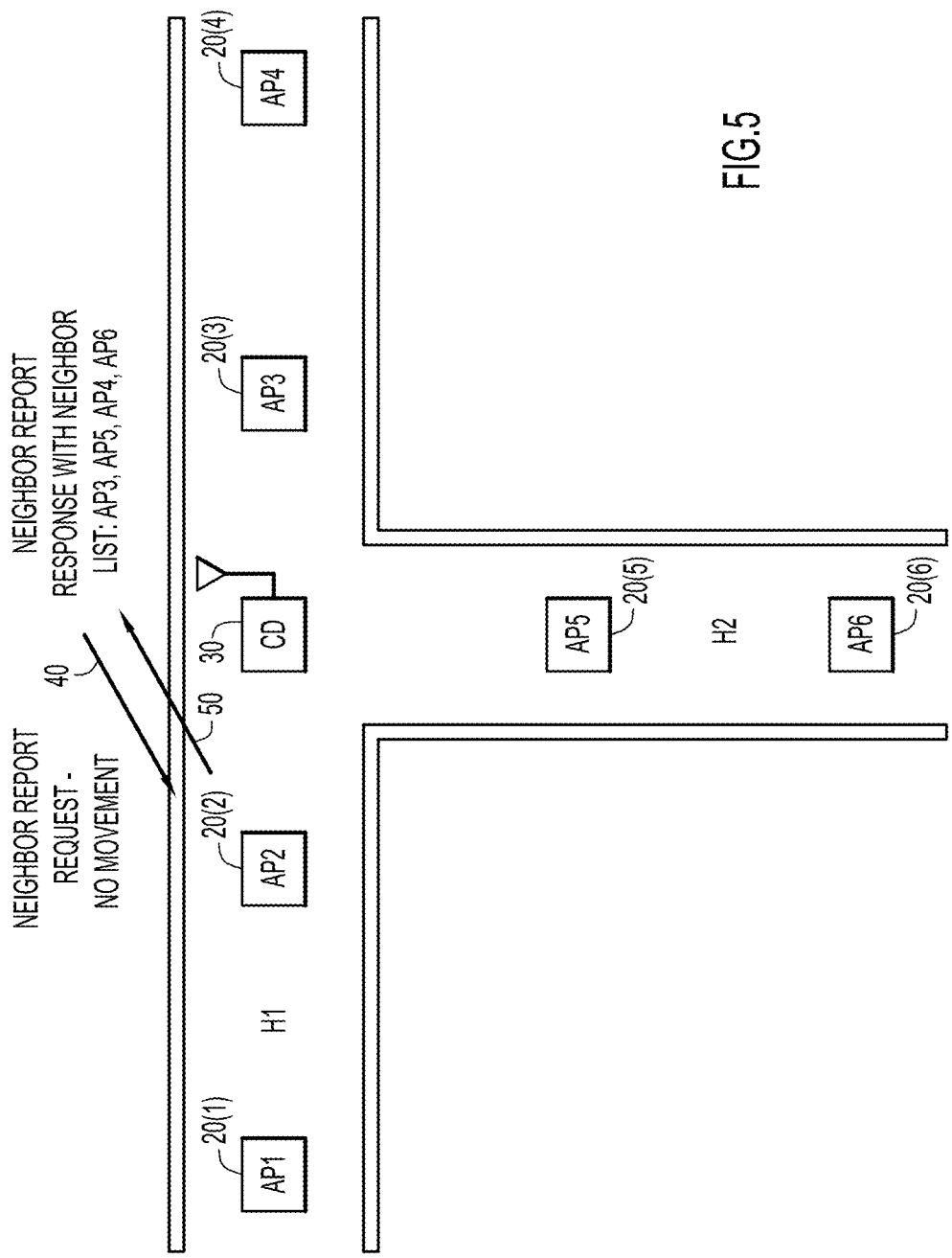

FIG. 5 illustrates an example in which the CD 30 is not moving (i.e., it is stationary). In this case, the neighbor report request message 40 contains information to indicate no direction of movement (or a stationary status). This information is evaluated to generate an AP neighbor list: AP3, AP5, AP4, AP6, based on the current location of the CD 30. If the CD 30 is not moving, the list of neighbor APs may be based on the receive signal strength information (RSSI) of client probe messages, location of the CD 30 or traffic seen by the APs.

Some CDs have the ability to determine the direction or orientation that a CD (or the person carrying/holding the CD) is facing, independent from determining the direction of movement of the CD. To this end, the facing direction of the CD or person holding the CD can be sent to the serving AP and used in determining which APs to include in the list of neighbor APs. This may be useful in particular when the client device is stationary. When the person holding the CD is facing one direction, one set of neighbor APs would be sent to the CD (assuming that the person moves in the direction that he/she is facing, at least for a period of time), and if the person is facing a different direction, a different set of neighbor APs would be sent to the CD. Thus, the facing direction of the CD or the person holding the CD may also be sent to the serving AP for purposes of determining the appropriate list of neighbor APs (particularly when the CD is stationary). It should be noted that if the CD is moving in a direction that is different than it is facing, then the direction of movement will take precedence over the facing direction for purposes of generating the appropriate set of neighboring APs.

Again, according to one aspect of the techniques presented herein, the wireless client device provides the infrastructure (APs and wireless network controller, etc.) with its direction of movement. The direction of movement information can be augmented with location information of the client device. The location of the client device can be derived by using triangulation and other techniques with respect to transmissions made from the client device and received at multiple APs.

It should be understood that the "direction of movement information" may also include speed (velocity) and/or acceleration of movement of the client device derived locally on the CD from digital compass and/or motion sensor output or computed by the infrastructure (serving AP or wireless controller) or CD from direction of movement information and location information of the CD at different instants of time. For example, if a CD is moving quickly, the list of AP neighbors may be provided based on the likelihood of the CD being close to an AP by the time the response is sent to the CD. Consider a deployment where there are numerous APs in a corridor and a user is running down the corridor. The neighbor AP list sent to the CD would be based on direction and also the speed at which the CD is moving, such that for example, every other AP along the path/direction of movement is sent in the neighbor list instead of every AP in the path/direction of movement due to the rapid movement of the CD.

Moreover, physical orientation or facing direction (N, NE, S, SE, etc.) of the CD may be included as part of the "direction of movement information." Moreover, "direction of movement information" may include an instantaneous direction of movement measurement made by the CD as well as a historical view of the direction of movement over time that can indicate likelihood that the CD will move in one direction or another. Such predictive-based analysis may be useful to reduce the need for the CD to continuously or repeatedly report its direction of movement. The historical context of CD movement may be maintained by the CD itself, by its serving AP or by the wireless network controller. Thus, the generation of the AP neighbor list (and related information) specific to the CD may be based at least in part on any one or more of the types of direction of movement information, as well as additional information.

The direction of movement information sent by the CD to its serving AP may be included in a standardized or vendor-specific information element (IE) of an IEEE 802.11 Neighbor Report Request message that is sent by the CD to its serving AP when the CD is requesting an AP neighbor list. The serving AP optimizes the 802.11 or vendor-specific roaming AP neighbor list by filtering entries according to the client device's direction of movement and related information.

Figure 6:
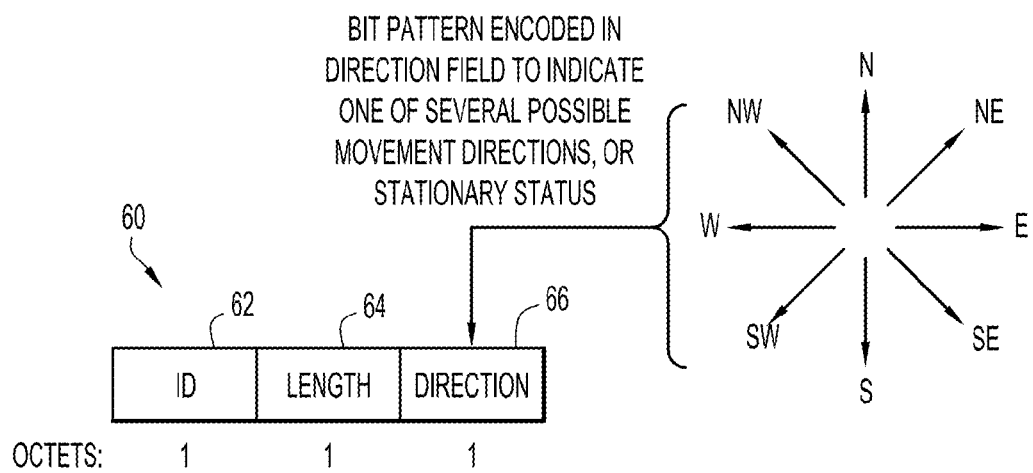
FIG. 6 is an example diagram of a sub-element of an information element that may be used to convey the direction of movement information from a client device to an access point.

The IEEE 802.11 Neighbor Report Request frame accommodates optional Vendor Specific sub-elements. Reference is now made to FIG. 6 for an example format of a direction of movement IE, generally shown at reference numeral 60. The direction of movement IE 60 comprises an identifier (ID) field 62, a length field 64 and a direction field 66. The direction field 66 contains sufficient bits to identify one of a plurality of directions, e.g., 8 directions as shown in FIG. 6. More directional granularity may be supported. In addition to the different directions that can be identified in the direction field 66, a value may be allocated in the direction field 66 to indicate that the client device is stationary. An additional sub-element may be added, or an additional field added to the IE 60, to indicate the facing direction of the CD or the person carrying/holding the CD, as explained above. Still another sub-element may be added to indicate the speed (velocity) and/or acceleration of movement of the CD derived from one or more sensors internal or attached to the CD.

Figure 7:
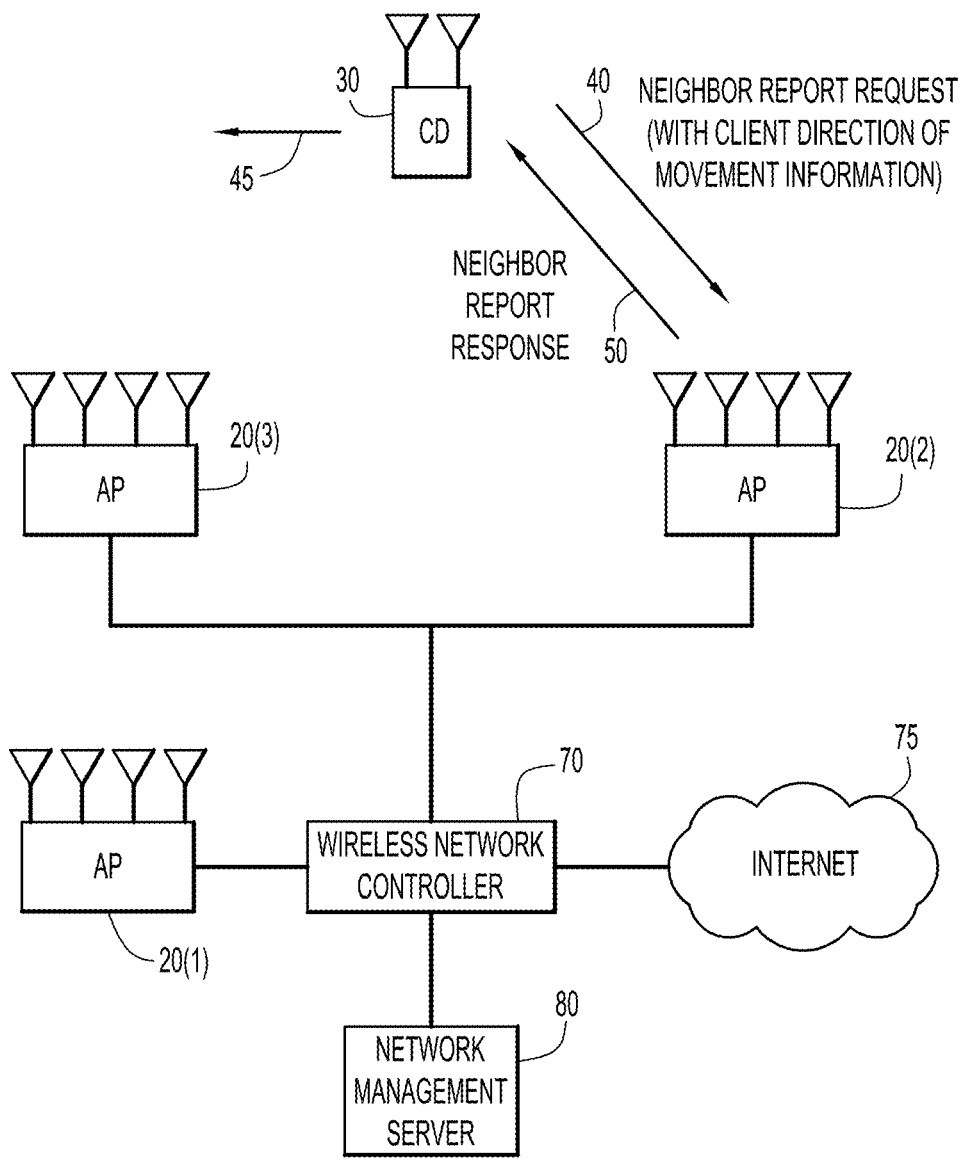
FIG. 7 is a system block diagram showing multiple access points, each of which communicates with a wireless network controller, and a moving wireless client device that transmits direction of movement information to its associated access point.

Turning now to FIG. 7, a system diagram is shown in which a plurality of APs, e.g., APs 20(1)-20(3), are deployed, and each of the APs is connected to a wireless network controller 70. The wireless network controller 70 controls delivery of wired network traffic to/from the Internet 75 to the APs 20(1)-20(3). As mentioned above, the wireless network controller 70 may also receive direction of movement information of a CD from its serving AP and generate the AP neighbor list and related information for the CD, which is forwarded to the serving AP, which in turn sends an appropriate over-the-air message to the CD with the AP neighbor list and related information. A network management server 80 communicates with the wireless network controller 70 (and with other wireless network controllers associated with other AP deployments). Data representing locations of the APs in a deployment is stored in the wireless network controller 70 and/or network management server 80, and disseminated to each of the APs in the deployment so that each AP knows its own location and the locations of all neighbor APs. In addition, locations of client devices (as they move about) may be determined from computations made by the wireless network controller 70 or network management server 80 based on RSSI for signals received from client devices at multiple APs in a deployment. There are numerous techniques now known or hereinafter developed that may be used for location determination of client devices. The client location may be continuously updated and disseminated to the APs in the deployment.

FIG. 7 also shows the transmission of a neighbor report request message 40 (including client device direction of movement information representing direction of movement shown by arrow 45) from CD 30 to its serving AP 20(2), and the sending of a neighbor report response message 50 (with an AP neighbor list specific to client device 30). Again, the generation of the AP neighbor list may be by the serving AP 20(2), the wireless network controller 70 or even the network management server 80.

The wireless network controller 70 stores information tracking the traffic load of each AP and the RF link quality/data rate supported by each AP. The wireless network controller 70 may obtain this information from reports it receives from the APs, and may disseminate the information to all of the APs so that each AP knows about the traffic load and RF link quality/data rate capability of all neighbor APs.

Still another function of the wireless network controller 70 is to send to APs near the AP to which a CD is currently associated, a message configured to provide to the nearby APs the media access control (MAC) address of the CD. The extra monitoring radio of the nearby APs (see the description of FIG. 11 below) monitors the data traffic of the target CD in order to measure the RSSI from transmissions made by the CD in order to compute the location of the CD.

Figure 8:
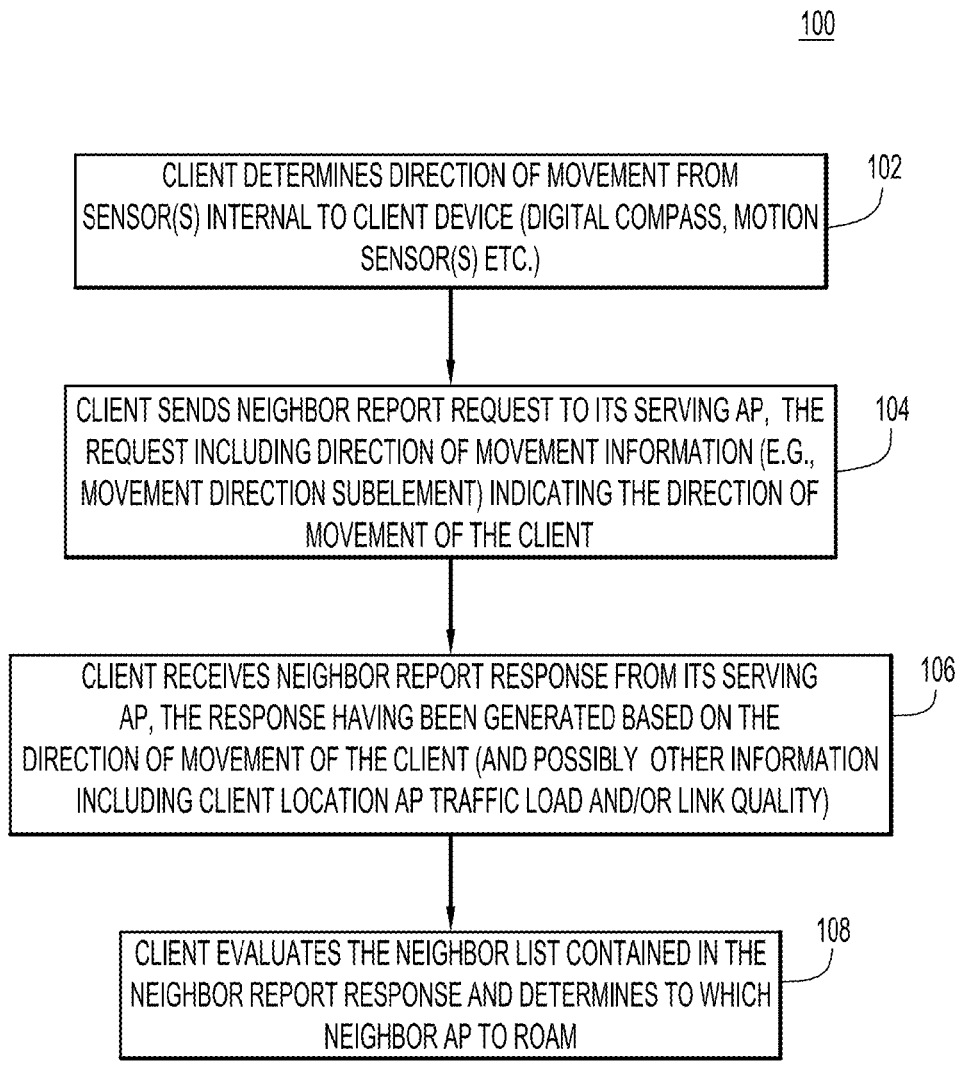
FIG. 8 is a flow chart depicting operations performed in a client device for carrying out the direction aware infrastructure assisted roaming techniques presented herein.
Figure 9:
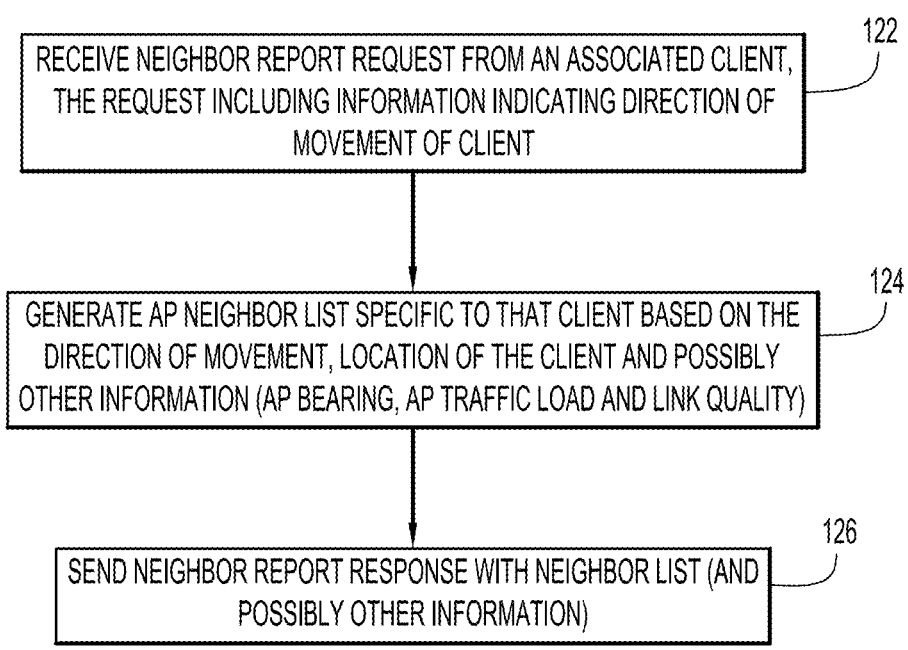
FIG. 9 is a flow chart depicting operations performed in a wireless network controller or access point for carrying out the direction aware infrastructure assisted roaming techniques presented herein.

Reference is now made to FIGS. 8 and 9 for a description of the operations performed in the CD and in the serving AP in connection with the techniques presented herein. Again, since many client devices, e.g., smart phones, are equipped with compass and/or motion sensor(s), these client devices can provide more accurate and timely direction of movement information than could otherwise be estimated by the WLAN infrastructure based on a difference of estimated locations over time. Moreover, the WLAN infrastructure has data representing the map and locations of the APs, an estimation of the client device's current location and historical information as to movement patterns of a client device. This AP location, map information, client device location and client device historical movement information may be used together with the direction of movement information (in any of the forms and types referred to above) contained in the client device's neighbor report request to intelligently build a direction of movement (bearing) aware AP neighbor list that is specific to each client device, to assist a client device when roaming.

FIG. 8 shows a flow chart for a process 100 performed in a client device. At 102, using a digital compass and/or motion sensor(s) internal to or associated with the client device, the client device determines its direction of movement. At 104, the client device generates a neighbor report request message that it sends to its serving AP. As described above, e.g., in connection with FIG. 6, the neighbor report request message comprises direction of movement information (in any of its various forms and types) indicating the direction of movement of the client device (or an indication that the client device is relatively stationary). The operation 104 may be performed on a periodic basis, in response to detection of motion (or change of movement direction) by the client device, or in response to the link quality with the serving AP dropping below a threshold, e.g., RSSI for signals received from the AP dropping below a threshold. The serving AP or wireless network controller will perform operations based on the neighbor report request (as described in more detail hereinafter in connection with FIG. 9).

At 106, the client device receives a neighbor report response from its serving AP. The response is generated by the serving AP or wireless network controller based on the direction of movement information of the client device, and possibly other information including client location, AP traffic load and/or link quality as described hereinafter. At 108, the client device evaluates the AP neighbor list contained in the neighbor report response and determines to which neighbor AP to roam when it is time for the client device to roam to a new AP.

Reference is now made to FIG. 9 for a description of a process 120 performed in the serving AP or in part by a wireless network controller. At 122, a neighbor report request from a client device is received. The neighbor report request includes direction of movement information (in any of its forms or variations referred to above) indicating direction of movement of the client device. At 124, an AP neighbor list that is specific to the client device is generated based at least in part on the direction of movement information of the client device. At 126, the neighbor report response with the AP neighbor list is sent to the client device.

As explained above, the serving AP, the wireless network controller, the network management server or another AP may perform operation 124. When a device other than the serving AP performs operation 124, then the neighbor report request message (containing the direction of movement information) is forwarded to that "other device" to enable it to generate the AP neighbor list and other information. That "other device" then sends the AP neighbor list and other information to the serving AP so that the serving AP can wirelessly transmit it in a neighbor report response or other message to the client device at operation 126.

Other information may be factored into the generation of the AP neighbor list, or included as additional information in a neighbor report response. For example, the traffic load for a particular neighbor AP may be used to determine a priority or preference to give that neighbor AP in the neighbor AP list. A neighbor AP with a relatively high amount (greater than some threshold) of traffic load may be de-emphasized as a desirable AP in the neighbor AP list. In this way, the client device may select from the neighbor AP list the AP closest to it based on its direction of movement and the capacity of the AP to handle traffic for the client device. Furthermore, the serving AP may indicate in the neighbor report response which of its neighbor APs has a better radio frequency (RF) link quality or higher data rate capability (from information received from the wireless network controller as explained above in connection with FIG. 7). This will allow the client device to select an AP that has a higher data rate capacity/better RF link quality than other candidate APs in the AP neighbor list. Rather than, or in addition to sending the secondary information related to AP traffic load and data rate capability, the serving AP may order the list of APs based on a combination of AP location with respect to the client device's direction of movement and the APs' traffic load or data rate capability, such that the determination of the AP's order in the list is based on a weight applied to a measure of the AP's traffic load or data rate capability and weight applied to the AP's location relative to the direction of movement (and location) of the client device. The weight for each of these items of information need not be the same.

As a variation or enhancement to the schemes described above, the serving AP may send AP bearing information in the neighbor report response, or in a management frame, such as an IEEE 802.11 Basic Service Set (BSS) Transition Management request frame. The AP bearing information indicates the relative direction of each AP (in the neighbor list) with respect to true north and to the reporting AP transmitting the management request frame or neighbor report response frame (or to the best estimate of the client location). To provide the list of AP neighbors, the serving AP will determine the list of AP neighbors and the list is further populated with information indicating relative position of each AP neighbor based on configuration information received from the wireless network controller 70, network management station 80 or command line interface (or calculated dynamically based on the client device's estimated location and the known locations of other APs).

When the AP transmits the management request frame or neighbor report response it includes this additional AP bearing sub-element information for each AP neighbor. The client device uses the AP bearing information to select an AP in the AP neighbor list based on the client device's knowledge of its direction of movement and the direction it is facing.

Still another variation is for the serving AP to send the location of itself and each neighbor AP in a sub-element in the neighbor report response or the transition management request frame. The wireless network infrastructure may not perform any filtering of APs in the neighbor list. The AP location may be expressed by a combination of (x,y) coordinates or (lat,long) coordinates, plus altitude or floor number. The sub-element format may be the same format as a Location Configuration Information Report. To preserve infrastructure geo-privacy, the infrastructure can share the AP locations among the APs in a deployment under the restriction that the APs use them solely for network access/management, and the AP or other wireless network equipment does not make the information available to other subsystems or outside entities.

The client device can determine its own location by an IEEE 802.11 Location Request/Report or can calculate its own location in any of several ways heretofore known, given that the client device knows the locations of its associated APs and neighbor APs. Together with its location and local knowledge of its direction of movement (bearing), the client device can autonomously perform the AP neighbor list filtering in order to select the best AP to roam to as it moves about a deployment area.

Figure 10:
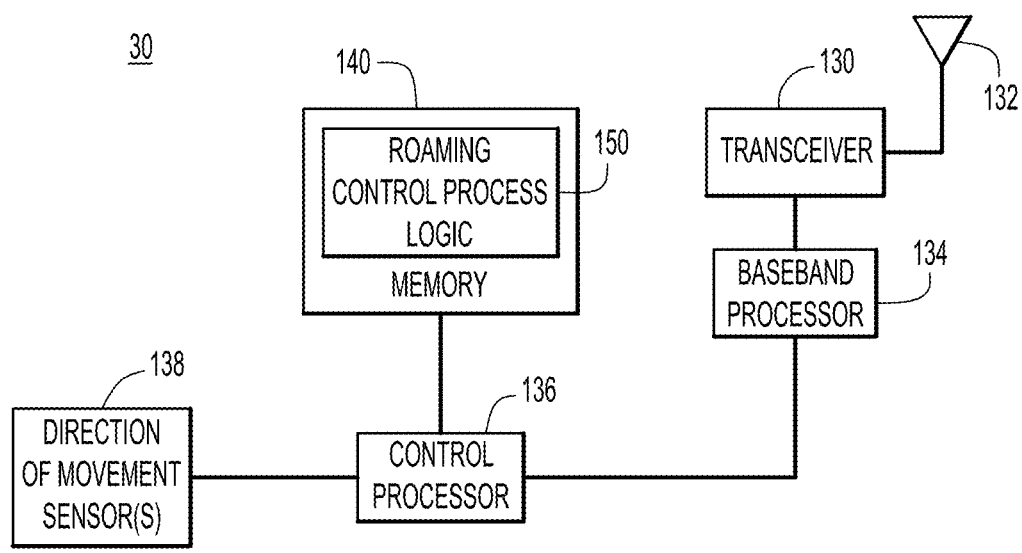
FIG. 10 is an example block diagram of a client device configured to participate in the direction aware infrastructure assisted roaming techniques presented herein.

Reference is now made to FIG. 10 for a description of a block diagram of a client device configured to participate in the techniques presented herein. Client device 30 comprises a radio transceiver 130, antenna 132 (or multiple antennas), baseband processor 134, a control processor (e.g., a microprocessor or microcontroller) 136, one or more direction of movement sensors 138 (e.g., digital compass, motion sensors, accelerometers, magnetic compasses, gyroscopes, global position system (GPS) receivers/sensors, etc.) and memory 140. The sensors 138 may be internal or attached to the client device 30. In the case of a digital compass sensor, the output of the sensor, in terms of orientation/facing direction include the main points of a compass, i.e., N, NE, E, SE, S, SW, W and NW. For direction of movement of the client device, the orientation/facing direction data output by the digital compass is used. In addition, the one or more sensors can be used to derive, on the client device, a measure of speed (velocity) of movement (e.g., m/sec or feet/sec) and/or acceleration (e.g., m/sec/sec or feet/sec/sec), or from client positions determined over time by the client device, etc.

The baseband signal processor 134 performs baseband modulation and demodulation according to a WLAN protocol, e.g., IEEE 802.11. The radio transceiver 130 performs radio frequency transmission and radio frequency reception for wireless communication with APs in a WLAN deployment. The radio transceiver 130 and the baseband processor 132 may be implemented in a chipset comprised of multiple integrated circuits.

Memory 140 may comprise read only memory (ROM), random access memory (RAM), magnetic disk storage media devices, optical storage media devices, flash memory devices, electrical, optical, or other physical/tangible memory storage devices. In general, the memory 140 may comprise one or more tangible (non-transitory) computer readable storage media (e.g., a memory device) encoded with software comprising computer executable instructions and when the software is executed (by the control processor 136) it is operable to perform the operations described herein.

The control processor 136 performs overall control of the client device 30. The control processor 136 in particular executes the roaming control process logic 150 stored in memory 140 to perform the client device operations described herein, e.g., in connection with FIGS. 1-8.

Figure 11:
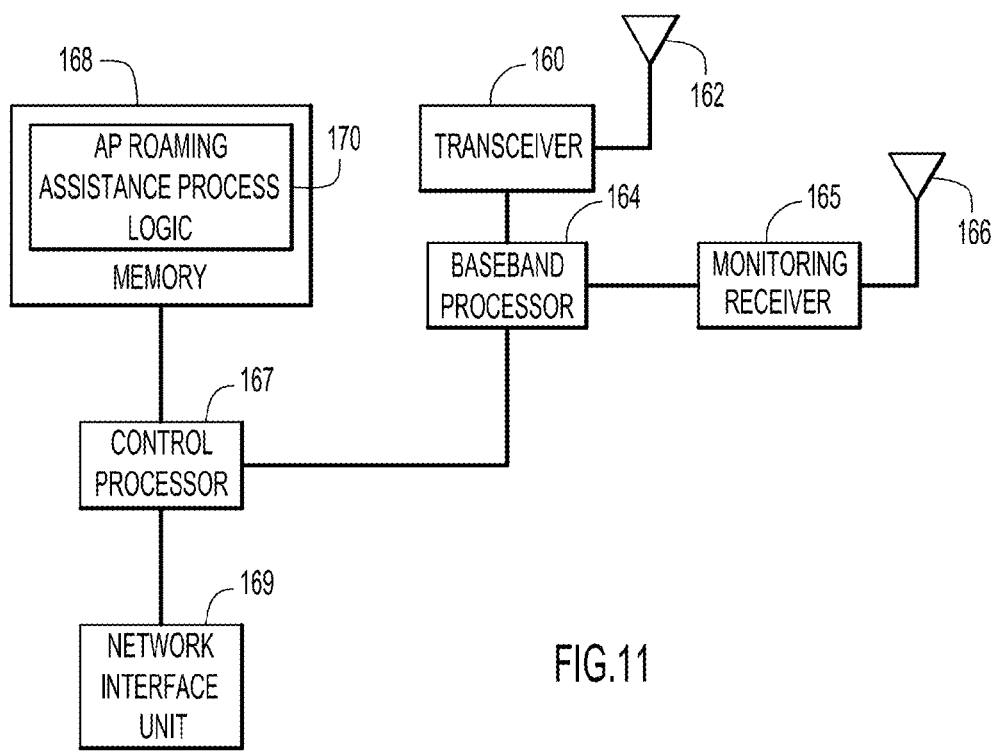
FIG. 11 is an example block diagram of an access point configured to participate in the direction aware infrastructure assisted roaming techniques presented herein.

Turning now to FIG. 11, an example block diagram is shown of an AP that is configured to participate in the techniques described herein. The AP, generically denoted by reference numeral 20(i), comprises a radio transceiver 160, an antenna 162 (though the AP may have multiple antennas), a baseband processor 164, an optional monitoring radio receiver 165 and an associated antenna 166, a control processor 167 and memory 168. A network interface unit 169 is provided that enables communications over a wired network, e.g., for communicating with a wireless network controller such as that shown in FIG. 7. The memory 168 stores processor executable instructions for AP roaming assistance process logic 170. The control processor 167 may be a microprocessor or microcontroller. The memory 168 may take the same form as memory 140 in the client device. The control processor 167 executes the AP roaming assistance process logic 170 stored in memory 168 to perform the AP operations described herein, e.g., in connection with FIGS. 1-7 and 9.

The optional monitoring radio receiver 165 may serve as a dedicated monitoring radio to obtain multiple RSSI samples of client traffic for purposes of detecting the location and potential link quality of client devices. This is useful for client devices that are in a power-save mode. A schedule (of times) can be established for listening to client packets on different channels by using predictive traffic analysis, or for voice-clients, the intervals in which the client device is awake. This schedule can be supplied to an off-channel scheduler function performed by the control processor 167, which will "park" the monitoring radio receiver 165 on the channels at the corresponding times.

Using the RSSI obtained from observing client traffic, it is possible to determine one or more preferred neighbor APs based on the RSSI measurements, together with the client device direction information, i.e., positive differences in RSSI correlated with the movement direction indicate potentially better coverage through a particular AP. This optimized neighbor AP list will be included/identified in the neighbor report response sent back to the client device. Further still, the RF characteristics signals received from the client device at one or more APs may be used to determine/confirm the direction of the movement of the client device.

Again, the monitoring radio in an AP allows the AP to observe the RSSI of any packet from a client on its own serving channel in-contrast to the occasional probes that an AP may receive during a client device's active channel scanning. Thus, the AP monitoring radio measurement mechanism has an advantage over current AP monitoring or sniffer modes because it is co-located with the AP radio transceiver that is potentially going to serve the client. This makes the measurement more accurate.

In summary, techniques are provided herein to equip or configure APs and client devices to cooperate in direction of movement aware infrastructure assisted roaming. An AP receives from an associated client device a message that includes direction of movement information indicating direction of movement of the wireless client device. The serving AP or other network infrastructure equipment (wireless network controller or network management server or other AP) generates a list of neighbor APs for the client device based on the direction of movement information. The serving AP sends to the client device a response message that contains the list of neighbor access point devices. The response message may be an IEEE 802.11 Neighbor Report Response message or an IEEE 802.11 BSS Transition Management Request frame that includes a vendor-specific or standardized sub-element containing, in addition to the list of neighbor APs, information of one or more of the locations of neighbor APs in the list, the direction/bearing of each neighbor AP in the list with respect to the serving AP (or estimated client device location).

A client device determines direction of movement (and optionally facing direction/orientation) using one or more sensors internal or attached to the client device. The client device sends to its serving AP a message including direction of movement information derived from the one or more sensors. Then, the client devices receives from its serving AP a message that includes a list of neighbor APs generated on the basis of the direction of movement information. The message sent by the client may be a neighbor request message, e.g., an IEEE 802.11 Neighbor Request Message, having a vendor-specific or standardized sub-element that contains the direction of movement information of the client device.

There are numerous advantages to the direction of movement aware infrastructure assisted roaming techniques. A suitably equipped client device can obtain its direction of movement more accurately, quickly, and frequently than the infrastructure. The use of the both client movement direction and location can optimize the neighbor AP list for the path of the moving client. Using client data traffic, RSSI measurements can be made and used to provide heavy traffic clients on the move with the most updated location information to assist their roaming while not degrading traffic performance from the client device having to perform off-channel scanning. The aforementioned client MAC list sent to each AP reduces the set of client devices that needs to be monitored by each AP and improves monitoring and measurement efficiency. The use of the monitoring radio co-located on the AP serving the client traffic provides better coverage than a monitoring mode AP and more accurate readings as monitoring radio antenna characteristics are very close in position to the antennas of the data serving radios of the AP.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:
1. A method comprising:
in a wireless local area network, receiving a message that includes direction of movement information indicating direction of movement of a wireless client device and an orientation of the wireless client device that is independent from the direction of movement;
applying a weight to the orientation relative to the direction of movement, and
generating a list of neighbor access point devices for the wireless client device based at least in part on the direction of movement, the orientation, and the weight applied to the orientation.

2. The method of claim 1, wherein the list of neighbor access point devices is in decreasing order preference based on the direction of movement information.

3. The method of claim 1, wherein generating the list of neighbor access point devices is based further on a location of the wireless client device and locations of neighbor access point devices.

4. The method of claim 1, wherein the list includes information indicating traffic load or data rate capability of the respective neighbor access point devices.

5. The method of claim 1, wherein the list includes information indicating relative bearing for each neighbor access point device.

6. The method of claim 1, further comprising sending to the wireless client device a response message that contains the list of neighbor access point devices.

7. The method of claim 6, wherein sending comprises sending the information indicating relative bearing information in a sub-element of an IEEE 802.11 frame.

8. The method of claim 1, wherein the list includes information to indicate location for each neighbor access point device.

9. The method of claim 1, further comprising observing traffic from the wireless client device with a monitoring radio receiver of the access point device, and wherein generating comprises determining one or more preferred neighbor access point devices for the wireless client device based on receive signal strength information obtained from observed traffic of the wireless client device.

10. The method of claim 1, wherein generating is based further on speed of movement of the wireless client device indicated in the message received from the wireless client device.

11. A method comprising:
at a wireless client device that operates in a wireless local area network, determining direction of movement and an orientation of the wireless client device that is independent from the direction of movement of the wireless client device with one or more sensors internal or attached to the wireless client device;
sending to a wireless access point serving the wireless client device a message including direction of movement information derived from the one or more sensors; and
receiving from the wireless access point at the wireless client device a message that includes a list of neighbor access points generated at least in part on the basis of the direction of movement, the orientation, and a weight applied to the orientation relative to the direction of movement.

12. The method of claim 11, further comprising the wireless client device selecting one of the access point devices in the list to roam to upon discontinuing service with the wireless access point currently serving the wireless client device.

13. The method of claim 12, wherein the message received at the wireless client device includes information indicating traffic load or data rate capability of the respective neighbor access point devices, and where selecting is based on the traffic load or data rate capability of the access point devices in the list.

14. The method of claim 12, wherein the message received at the wireless client device includes information indicating relative bearing information for each neighbor access point device in the list, and wherein selecting is based on the direction of movement of the wireless client device and the relative bearing information for each neighbor access point device in the list.

15. The method of claim 12, wherein the message received at the wireless client device includes information indicating location of each neighbor access point device in the list, and wherein selecting is based on the location of each neighbor access point device in the list.

16. The method of claim 15, further comprising determining a location of the wireless client device, and wherein selecting is based on the location of the wireless client device and the locations of the wireless access point devices in the list.

17. The method of claim 16, wherein selecting is based further on a predicted future location of the wireless client device based on a current location and the direction of movement.

18. The method of claim 17, wherein the message sent to the wireless access point comprises a sub-element containing the direction of movement information.

19. The method of claim 18, wherein the message sent to the wireless access point is formatted in accordance with an IEEE 802.11 Neighbor Request Message.

20. The method of claim 11, wherein the message sent to the wireless access point comprises a sub-element containing speed of movement of the wireless client device derived from the one or more sensors internal or attached to the wireless client device.

21. An apparatus comprising:
a transceiver unit configured to transmit and receive signals in a wireless local area network in order to serve wireless client devices in the wireless local area network;
a baseband processor configured to baseband modulate signals for transmission by the transceiver unit and to demodulate signals received by the transceiver unit;
a control processor coupled to the baseband processor, wherein the control processor is configured to:
receive from an associated wireless client device a message that includes direction of movement information indicating direction of movement of the wireless client device and an orientation of the wireless client device that is independent from the direction of movement;
apply a weight to the orientation relative to the direction of movement; and
generate a response message that contains a list of neighbor access point devices to be sent to the wireless client device, the list generated based at least in part on the direction of movement, the orientation, and the weight applied to the orientation.

22. The apparatus of claim 21, wherein the control processor is configured to forward the direction of movement information to another device, and to receive the list of neighbor access points generated by the other device.

23. The apparatus of claim 21, wherein the control processor is configured to generate the list of neighbor access point devices for the wireless client device based at least in part on the direction of movement information.

24. The apparatus of claim 23, wherein the control processor is configured to generate the list of neighbor access point devices based further on a location of the wireless client device and locations of neighbor access point devices.

25. The apparatus of claim 21, wherein the control processor is configured to include in the response message information indicating relative bearing for each neighbor access point device in the list.

26. An apparatus comprising:
a transceiver unit configured to transmit and receive signals in a wireless local area network;

a baseband processor configured to baseband modulate signals for transmission by the transceiver unit and to demodulate signals received by the transceiver unit;

one or more sensors configured to determine direction of movement of the apparatus and an orientation of the apparatus that is independent from the direction of movement;

a control processor coupled to the baseband processor and configured to:
- send to a wireless access point a message including direction of movement information derived from the one or more sensors; and
- receive from the wireless access point a message that includes a list of neighbor access points generated at least in part on the basis of the direction of movement, the orientation, and the weight applied to the orientation.

27. The apparatus of claim 26, wherein the control processor is configured to select one of the access point devices in the list to roam to upon discontinuing service with the wireless access point currently serving the wireless client device.

28. The apparatus of claim 26, wherein the control processor is further configured to include in the message speed of movement derived from the one or more sensors.

29. The apparatus of claim 26, wherein the list includes information indicating relative bearing information for each neighbor access point device, and the control processor selects an access point device based on the direction of movement of the wireless client device and the relative bearing information for each neighbor access point device in the list.

30. One or more non-transitory computer readable storage media encoded with software comprising computer executable instructions and when the software is executed operable to:
- receive from a wireless client device a message that includes direction of movement information indicating direction of movement of the wireless client device and an orientation of the wireless client device that is independent from the direction of movement;
- apply a weight to the orientation relative to the direction of movement; and
- generate a list of neighbor access point devices for the wireless client device based on the direction of movement information, the orientation, and the weight applied to the orientation.

31. The computer readable storage media of claim 30, wherein the list includes information indicating traffic load or data rate capability of the respective neighbor access point devices.

32. The computer readable storage media of claim 30, wherein the instructions operable to generate further comprise instructions operable to include information to indicate location for each neighbor access point device in the list.

33. The computer readable storage media of claim 30, further comprising instructions operable to generate a message that contains the list of neighbor access point devices, the message for transmission to the wireless client device.

* * * * *

UNITED STATES PATENT AND TRADEMARK OFFICE
CERTIFICATE OF CORRECTION

| | | |
|---|---|---|
| PATENT NO. | : 8,934,369 B2 | Page 1 of 1 |
| APPLICATION NO. | : 13/645576 | |
| DATED | : January 13, 2015 | |
| INVENTOR(S) | : Min Cao et al. | |

It is certified that error appears in the above-identified patent and that said Letters Patent is hereby corrected as shown below:

IN THE CLAIMS

Column 14, Line 14, delete the word "information" after the word "movement"

Signed and Sealed this
First Day of March, 2016

Michelle K. Lee
*Director of the United States Patent and Trademark Office*